H. H. HALL.
CLAMPING DEVICE.
APPLICATION FILED JUNE 10, 1908.

947,282.

Patented Jan. 25, 1910.

Witnesses.
C. H. Gannett.
J. Murphy.

Inventor:
Herman H. Hall
by Jas. H. Churchill
Atty.

UNITED STATES PATENT OFFICE.

HERMAN H. HALL, OF QUINCY, MASSACHUSETTS.

CLAMPING DEVICE.

947,282.

Specification of Letters Patent. Patented Jan. 25, 1910.

Application filed June 10, 1908. Serial No. 437,725.

*To all whom it may concern:*

Be it known that I, HERMAN H. HALL, a citizen of the United States, residing in Quincy, county of Norfolk, and State of Massachusetts, have invented an Improvement in Clamping Devices, of which the following description, in connection with the accompanying drawings, is a specification, like characters on the drawings representing like parts.

This invention relates to an adjustable clamp or holding device, especially designed and adapted among other uses to be employed on canoes as a support or holder for parasols, flagstaffs and like devices.

The invention has for its object to provide a simple, inexpensive and efficient holding device, which is capable of being adjusted so that the parasol or other device may be turned into different positions vertically and horizontally and held in such positions subject to the will of the operator. For this purpose I employ a clamping device to engage the rod or stem of the parasol or other article, and pivotally secure one member of the clamp so as to move in one plane, to a device or carrier which is mounted on a suitable support to move in another plane substantially at right angles to the first mentioned plane. Provision is made for securing the support referred to, to the canoe. These and other features of this invention will be pointed out in the claims at the end of this specification.

Figure 1:
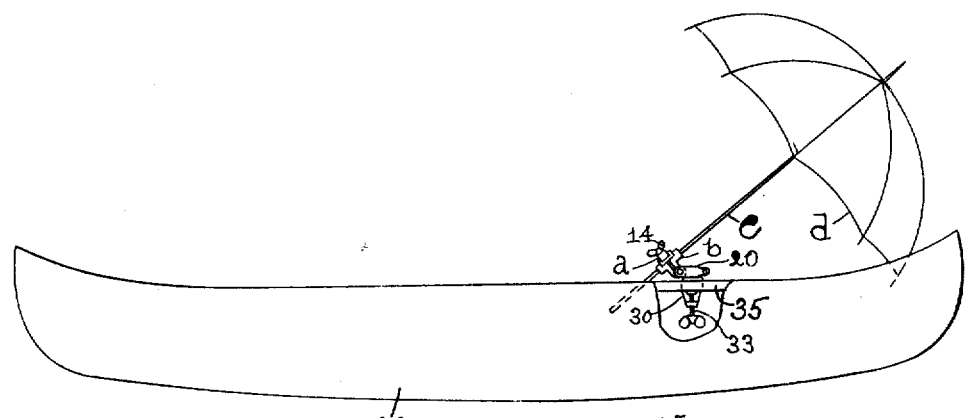
Figure 2:
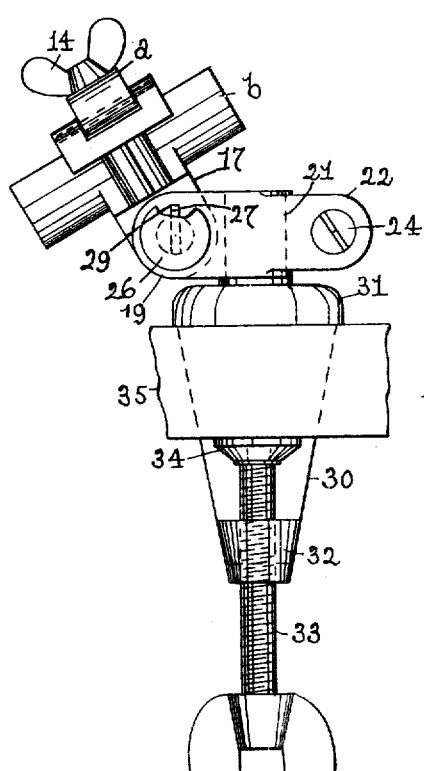
Figure 4:
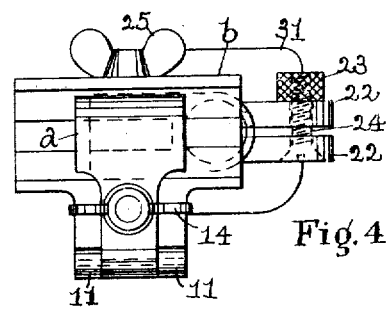
Figure 5:
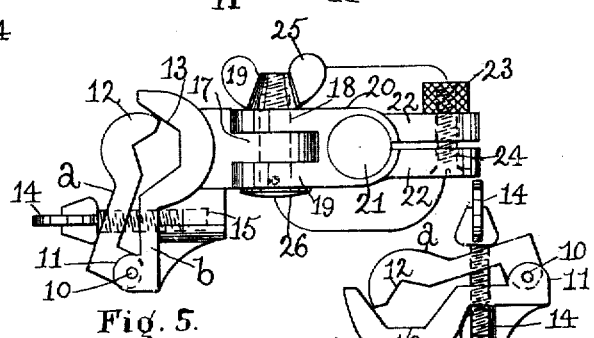
Figure 3:
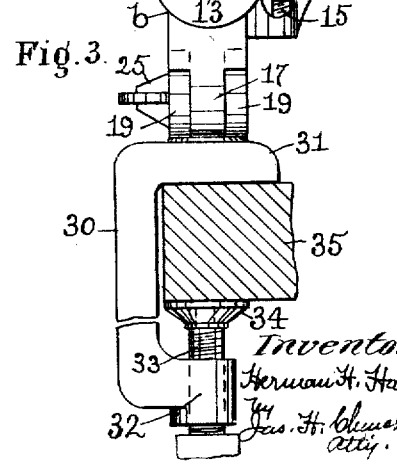

Figure 1 represents in side elevation a canoe provided with a holding device embodying this invention. Fig. 2, a side elevation on an enlarged scale of the holding device shown in Fig. 1. Fig. 3, an end elevation of the holding device, showing the gunwale of the boat in section. Fig. 4, a plan with the clamp in one position, and Fig. 5, a plan with the clamp in a different position.

Referring to the drawing $a$ represents one member and $b$ the other member of a clamp or holding device, which is mounted or supported as will be described, so as to enable the rod or stem $c$ of a parasol $d$ to be turned or adjusted into any desired position. In the present instance the member $a$ is shown as a bar mounted at its rear end on a pivot 10 supported in ears 11 on the rear end of the member $b$, and said members are provided at the front ends with gripping jaws 12, 13, the jaw 13 being preferably made substantially long to afford a long bearing for the rod or stem $c$, and both jaws being suitably shaped to partially embrace the said rod or stem and firmly hold it against slipping, the said jaws being shown as of angular shape in cross-section.

The member $a$ has coöperating with it a screw 14, which extends through the same and into a threaded socket 15 in the member $b$, said screw having a winged head, by means of which the operator can turn it into its socket so as to move the free end of the member $a$ toward the member $b$ and thus firmly grip the rod or stem $c$.

The member $b$ is provided with a lug 17 on its under side which is mounted to turn on a pivot pin 18 carried by ears 19 on a movable carrier 20 for the clamp, which carrier is mounted to turn on a stud or post 21 projecting from the top of a device, which constitutes a support for the holding or clamping device. The carrier 20 is provided with a split socket or opening into which the post 21 extends and from which socket project lugs or ears 22, which are designed to be moved toward each other by a nut 23 on a screw 24 (see Figs. 4 and 5), so as to cause the split socket to grip the stud or post 21 and hold the carrier 20 from turning in a plane substantially at right angles to the plane in which the clamping member $b$ is turned.

The clamping member $b$ is adapted to be held in its adjusted position by forcing the lugs or ears 19 into firm engagement with the projection 17, which may be effected by a nut 25 engaging the threaded end of the pivot pin 18, which is provided with the head 26.

The pivot pin 18 may be held from rotation by means of a pin or lug 27 on the pivot pin 18 engaging a slot 29 in one of the ears 19.

The support for the clamp and its carrier may be of any suitable construction and is herein shown as a clamping device comprising a bar 30 having at its upper end an arm 31, which extends at right angles thereto and from which the post 21 projects, and having at its lower end a hollow boss 32 provided with screw-threads which are engaged by a threaded rod 33 having a button 34 at its upper end, which is designed to be forced into engagement with the underside of the gunwale 35 or other part of the canoe, so as to grip the gunwale between said button and the arm 31, thus firmly securing the support for the clamp or holding device and its movable carrier to the canoe 36 at the part of the same where it is desired to support the parasol or other device.

After the support for the clamping device and its movable carrier has been fastened to the canoe, the stem or rod c is inserted between the members a, b, of the clamp, and the screw 14 is turned so as to cause the clamp to firmly grip the said rod. The clamping member b is then adjusted so as to incline the rod or stem c at the desired or proper angle and when so adjusted, the clamping member b is secured in this position to the carrier 20 by turning up the nut 25. The carrier 20 may then be turned on the post 21 in a horizontal plane, so as to bring the parasol in the desired position and between the person and the sun and may then be secured in this position by turning up the nut 23.

From the above description, it will be seen, that the rod or stem c and the parasol are practically secured to a clamp having a universal joint, so that the parasol may be adjusted in a vertical plane and also in a horizontal plane, and the friction created by turning the nuts 25, 23 may be such as to cause the parasol to be held in the position into which it may be adjusted or turned, and yet be such as to permit the clamping device to be turned in a vertical plane on its pivot 18 and the carrier 20 to be turned on its post or pivot 21, by the occupant of the canoe pushing or pulling on the rod or stem c. In other words, after the clamping device has been once adjusted, it can be moved into different positions, by using the rod or stem c as a lever or handle.

I have herein described the clamping device as employed for holding the rod or stem of a parasol, but I do not desire to limit my invention in this respect, as the device can be used equally as well for holding flag-staffs and other rods. So also the device may be used in other places than on a canoe.

Claims.

1. In a device of the character described, in combination, clamping members pivoted together at one end and provided with gripping jaws at their other end, means to move one of said members toward the other, a movable carrier for said clamping members having a split socket from which ears are extended, means to pivotally secure one of said clamping members to said carrier to move in one plane, means to secure said clamping members in their adjusted position on said carrier, a support upon which said carrier is pivoted to move in a plane substantially at right angles to the plane in which the clamping device is moved, and means coöperating with said ears to secure said carrier in its adjusted position, substantially as described.

2. In a device of the character described, in combination, clamping members pivoted together at one end and having their free ends provided with gripping jaws between which a rod or staff is capable of being inserted, means to move one jaw toward the other to grip said rod or staff, a carrier to which one of said members is pivoted to move in one plane, said carrier having a split socket from which extend ears, a pivot upon which said carrier is mounted to move in a plane substantially at right angles to the first-mentioned plane, a support for said pivot, means to secure said clamping members in their adjusted position on said carrier, means coöperating with said ears to secure said carrier in its adjusted position on its pivot, and means to secure said support in a fixed position, substantially as described.

3. In a device of the character described, in combination, clamping members pivoted together at one end and having their free ends provided with gripping jaws, a screw extended through one member and into a socket in the other member, a lug or projection on the socketed member, a carrier provided with ears between which said lug or projection is inserted, a pivot pin extended through said ears and lug and provided with screw-threads at one end, a nut to engage said screw-threads and capable of clamping the lug or projection between said ears, a post upon which said carrier is pivoted to move in a plane substantially at right angles to that in which the clamping members are moved, a split socket in said carier from which ears are extended, a screw extended through the ears of said socket, and a nut to engage said screw, substantially as described.

4. In a device of the character described, in combination, clamping members capable of gripping a rod or staff inserted between them, a carrier to which one of said members is pivoted to move in one plane, a pivot for said carrier to permit the latter to move in a plane substantially at right angles to the first-mentioned plane, means to secure said clamping members in their adjusted position, and means to secure said carrier in its adjusted position, a movable support for said pivot, and means coöperating with said support to secure it in a stationary position, substantially as described.

5. In a device of the character described, in combination, clamping members pivoted together at one end and having their free ends provided with gripping jaws capable of gripping a rod or staff inserted between them, a carrier to which one of said members is pivoted to move in one plane, a pivot for said carrier to permit the latter to move in a plane substantially at right angles to the first-mentioned plane, means to secure said clamping members in their adjusted position, and means to secure said carrier in its adjusted position, substantially as described.

In testimony whereof, I have signed my name to this specification in the presence of two subscribing witnesses.

HERMAN H. HALL.

Witnesses:
   JAS. H. CHURCHILL,
   MARIE G. HALL.